United States Patent [19]

Freitas et al.

[11] 4,209,750
[45] Jun. 24, 1980

[54] SWEPT-CARRIER TRANSMISSION SYSTEM ADAPTED FOR USE IN PROCESS CONTROL SYSTEMS

[75] Inventors: Manuel P. Freitas, South Easton, Mass.; Jacob Klapper, New York, N.Y.

[73] Assignee: The Foxboro Company, Foxboro, Mass.

[21] Appl. No.: 916,600

[22] Filed: Jun. 19, 1978

[51] Int. Cl.² .............................................. H04B 1/06
[52] U.S. Cl. ....................................... 455/63; 455/71; 455/265
[58] Field of Search ................... 325/63, 64, 131, 34, 325/35, 65, 42, 45, 346, 473, 423, 418, 419, 30, 32, 47, 464; 179/15 BM

[56] References Cited

U.S. PATENT DOCUMENTS

| | | | |
|---|---|---|---|
| 2,206,695 | 7/1940 | Guanella | 325/423 |
| 2,448,055 | 8/1948 | Silver et al. | 325/464 |
| 3,470,477 | 9/1969 | Battail et al. | 325/45 |
| 3,617,892 | 2/1971 | Hawley et al. | 325/47 |
| 3,624,507 | 2/1971 | Fukata et al. | 325/131 |

*Primary Examiner*—Marc E. Bookbinder
*Assistant Examiner*—Alexander Gerasimow

*Attorney, Agent, or Firm*—Parmelee, Johnson, Bollinger & Bramblett

[57] ABSTRACT

A data transmission system comprising a transmitter producing a high-frequency carrier modulated with data and swept in a repetitive time pattern over a wide frequency range. The modulation of the carrier is so controlled that a characteristic of the data signal modulation has a predetermined relationship with respect to the repetitive sweep time pattern. The system receiver comprises a narrow-band IF channel coupled to the output of a mixer arranged to receive the incoming swept-carrier signal and a correspondingly-swept local oscillator signal. The sweep control signal for the local oscillator is developed by a circuit coupled to the mixer output and responsive to the data modulation on the IF signal. In one disclosed embodiment, the transmitter carrier is frequency-swept with a sinusoidal time pattern, the data signals have a biphase format with a frequency one-half that of the carrier sweep frequency, and the sweep control signal for the local oscillator is developed by directing the biphase data signals to a 2X frequency multiplier the output of which is filtered to produce a sinewave control signal for the local oscillator.

27 Claims, 21 Drawing Figures

SWEPT CARRIER WITH BIPHASE DATA — E

SWEPT CARRIER — D

SWEEP SIGNAL — C

BIPHASE DATA SIGNAL — B

NRZ DATA SIGNAL — A

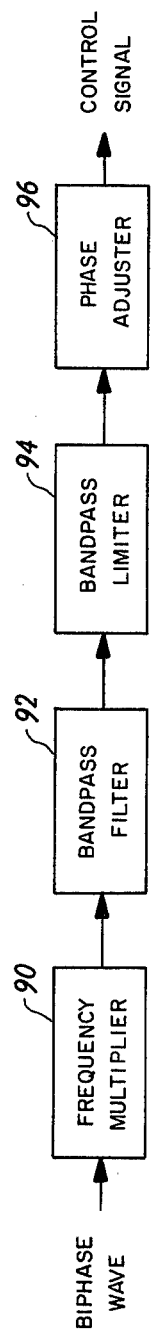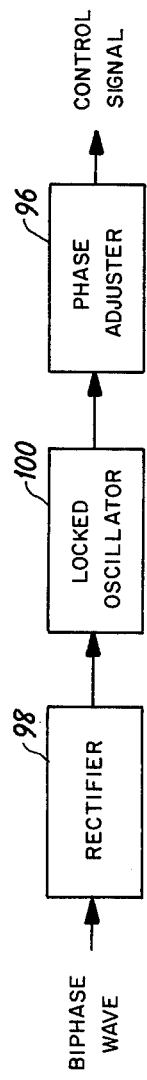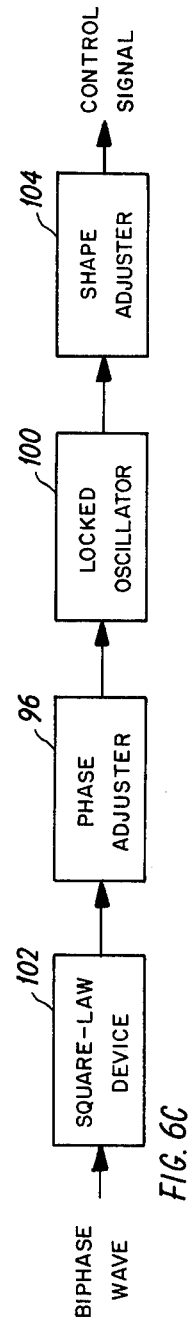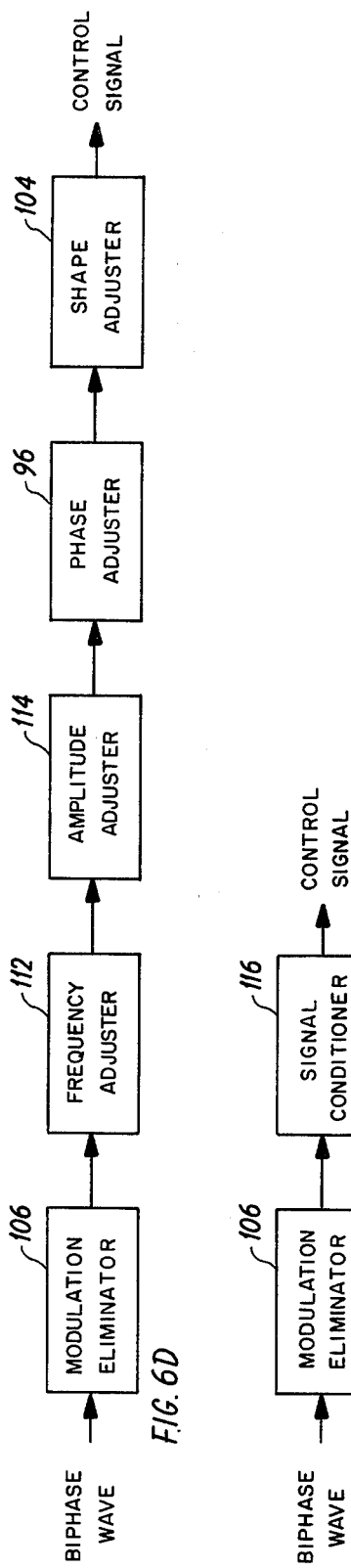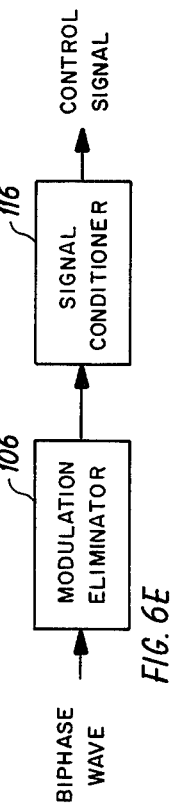

SWEPT-CARRIER TRANSMISSION SYSTEM ADAPTED FOR USE IN PROCESS CONTROL SYSTEMS

BACKGROUND OF THE INVENTION

1. Field of the Invention

This invention relates to industrial process control systems of the general type disclosed in U.S. Pat. application Ser. No. 833,977, filed on Sept. 16, 1977, by M. P. Freitas et al. More particularly, this invention relates to an improved swept-carrier data transmission system providing privacy and resistance to various interferences such as noise or willful or accidental jamming, and especially to a frequency-tracking receiver for use in such a system.

2. Description of the Prior Art

Frequency-tracking receivers commonly have an internal oscillator with a center frequency differing from the received carrier but of similar sweep. As the received carrier and the output of the internal oscillator are mixed (heterodyned), an intermediate frequency (IF) carrier is obtained with the sweep reduced to a sweep error signal but with the data modulation remaining intact. The result is that the IF carrier may be filtered through a bandwidth essentially dictated by the data modulation and the sweep error signal.

Alternatively, the received carrier can be passed through a narrow-band filter the center frequency of which tracks the center frequency of the received carrier. Here again, the received carrier of a wide frequency sweep is filtered through a narrower IF bandwidth.

Generally, frequency tracking receivers fall into two categories:

(1) In the first category are receivers arranged to reduce all frequency deviations from the center frequency of the carrier. Thus, for example, a carrier of a complex non-predescribed deviation will have its total deviation tracked at each instant. Applications of this type include frequency modulation (FM) demodulation at a lowered noise threshold, and a reduction of incidental FM in amplitude modulation (AM) transmissions. (2) In the second category are receivers arranged to track only the moving center frequency of a carrier; any other components of the frequency deviation, if present, are not to be tracked. Applications of this type are found in communication systems utilizing a varying carrier center frequency for privacy or resistance to jamming and noise.

Receivers for these two categories of tracking differ in important ways. One example of the first category, often referred to in the literature as the "FM Feedback Loop", is disclosed by Guanella in U.S. Pat. No. 2,206,695, and its design is discussed extensively in J. Klapper and J. Frankle, *Phase-Locked and Frequency-Feedback Systems*, New York: Academic Press, 1972. In systems of the second category, frequency and phase synchronization has been effected by means of synchronization pulses transmitted through a separate channel as taught by Kendall in U.S. Pat. No. 1,592,940, or by means of synchronization pulses produced in the receiver by the movement of the swept carrier through a fixed narrow-band IF filter as taught by Silver, et al, in U.S. Pat. No. 2,448,055.

U.S. application Ser. No. 790,156, filed Apr. 22, 1977, by Victor A. Bennett, Jr. for "Continuously-Synchronized Tracking Receiver for A Priori Defined Swept Carriers", and assigned to the assignee of the present invention, discloses a receiver utilizing a filtered carrier signal to drive a frequency discriminator circuit which produces a sweep error signal. A phase-locked loop responsive to this error signal develops a sweep frequency signal which is used to control the receiver sweep in a continuous manner.

The known prior art referred to above suffers from important disadvantages which the present invention overcomes or significantly minimizes.

SUMMARY OF THE INVENTION

In preferred embodiments of the invention to be described hereinbelow in detail, a characteristic of the data signals carried by the transmitter swept carrier is controlled in accordance with the repetitive time pattern of the transmitter sweep signal. At the receiver, this characteristic of the data signals is decoded and used to control the sweep of the local oscillator which is mixed with the incoming carrier.

Since with this system the center frequency of the transmitted carrier is tracked effectively identically by the receiver local oscillator (except for the usual fixed IF offset), the resultant signal developed by the mixer has essentially no sweep component, i.e. the carrier sweep error signal is "cancelled", so as to produce at the mixer output a non-sweeping data-modulated signal suited for passage through a narrow-band IF stage. Since the frequency sweep signal has been virtually eliminated, the IF stage bandwidth need be as a practical matter only wide enough to pass the data modulation, thereby to effect filtering of all frequencies beyond the band-pass range. This filtering of the non-sweeping signal in a minimum bandwidth channel maximizes the noise immunity of the system, since it permits use of a narrower IF passband. After passing through such narrow-band stage, the data signals are demodulated and utilized in conventional fashion.

In accordance with one specific embodiment of the invention to be described hereinbelow, the transmitter carrier is swept in accordance with a periodic time pattern which is harmonically locked to the period of the data signals and fixed in phase relationship with respect to those data signals. The data may be superimposed on the carrier by any of the known modulations, such as FM, phase modulation (PM), or AM. At the receiver, the data signals may be used either directly to generate a tracking control signal, or indirectly by synchronizing an oscillator to the exact frequency and phase required for tracking. Automatic means also may be included where it is desired to cancel any small amplitude or phase errors in the local oscillator sweep.

Accordingly, a primary object of this invention is to provide an improved swept-carrier data transmission system for use in applications such as industrial process control, and which is adapted to afford excellent privacy of communication and resistance to noise or other interference. Other objects, aspects and advantages of the invention will in part be pointed out in, and in part apparent from, the following description considered together with the accompanying drawings.

BRIEF DESCRIPTION OF THE DRAWINGS

FIGS. 6A through 6E illustrate arrangements for deriving a tracking control signal from the received data signal;

DESCRIPTION OF PREFERRED EMBODIMENTS

Figure 1:
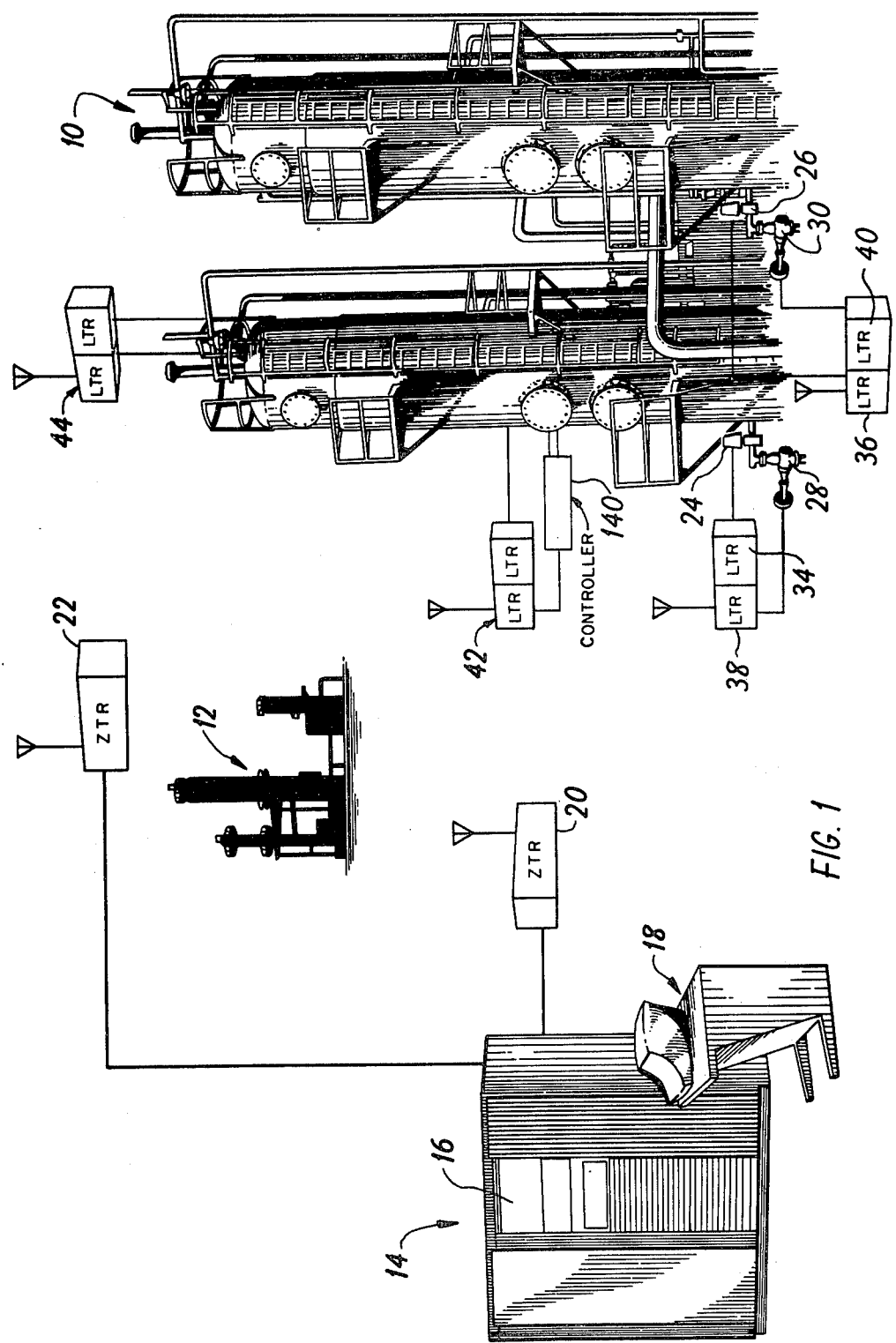
FIG. 1 illustrates an industrial process and associated control system of the type with which the present invention can advantageously be employed.

FIG. 1 is a duplicate of FIG. 1 of the drawings in U.S. Pat. application Ser. No. 833,977 and serves to provide an illustration of a typical industrial process and an associated control system of a kind with which the present invention can be used with advantage. The process shown in FIG. 1 includes a close-by process unit consisting of a pair of catalytic crackers generally indicated at 10, and a more distant process unit generally indicated at 12. At the left in FIG. 1 is shown a central control station 14, having a digital computer 16 with associated equipment including for example an operator's console 18 with data-entry keyboard facilities and the like.

Connected to the central station 14 are two swept-carrier transmitter/receiver units 20, 22 referred to herein as primary or "zone" transmitter/receiver units (ZTR for short). The actual number of such units used for any given installation will depend upon the nature and complexity of the process, with two having been shown in FIG. 1 only for convenience of illustration. These units are controlled by the computer 16, and for most of their operation they will be held in transmit mode producing swept-carrier transmissions directed to the field area zones occupied by the process units 10 and 12.

The two process units 10, 12 have associated therewith the usual kinds of instrumentation equipment, a portion of which is illustratively shown in the form of sensing elements 24, 26 and process valves 28, 30 with the close-by process unit 10. Each device is connected to a respective swept-carrier transmitter/receiver unit 34, 36, 38 and 40 assigned thereto. These units are referred to herein as local transmitter/receiver units (LTRs). Each includes equipment for receiving and tracking the swept-carrier signal developed by the associated ZTR 20, and for transmitting back to that ZTR swept-carrier signals which are received and tracked by the receiver portion of that ZTR unit. The process unit 10 typically will include other clusters of instrumentation, the elements of which will be connected to further LTRs illustratively shown at 42, 44. Where appropriate, any such clusters of instrumentation can be serviced by a single LTR provided with suitable multiplexing circuitry.

The other process unit 12 will have its own instrumentation, which in turn will be connected to respective LTRs (not shown) for transferring data to and from the other ZTR 22.

Figure 2:
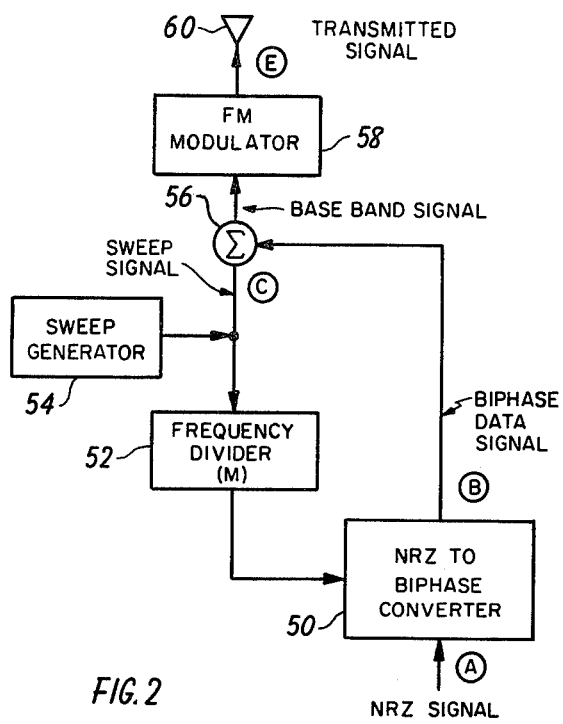
FIG. 2 shows the basic elements of a transmitter for producing a swept-carrier signal incorporating features of the present invention.

FIG. 2 shows a transmitter for producing a swept-carrier signal of the type suited for the present invention. Such transmitter might, for example, form part of the ZTR units 20, 22 shown in FIG. 1. FIGS. 3A-3E show signal waveforms at circuit points in FIG. 2 which are identified by corresponding letter designators (i.e. A, B, etc.). The graphs of FIGS. 3A-3E are positioned with their abscissae aligned in time with respect to a vertical line so as to show the correspondence in time between the various waveforms.

Figure 3E:
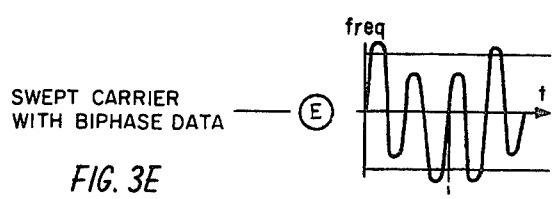
FIGS. 3A through 3E are graphs illustrating the signal wave forms at selected points in the transmitter of FIG. 2, and indicating the time relationships of such wave forms.
Figure 3D:
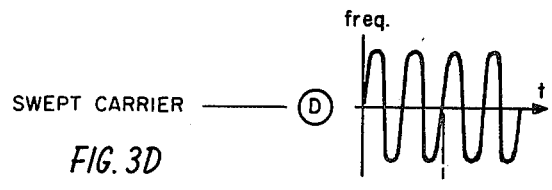
Figure 3C:
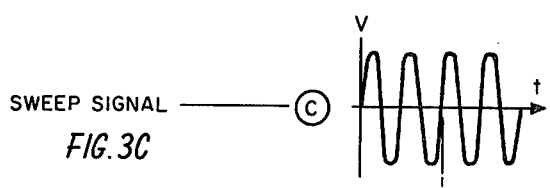
Figure 3B:
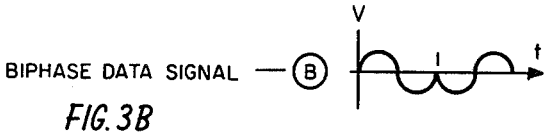
Figure 3A:
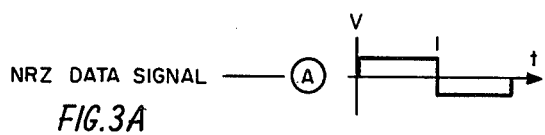

The data signal to be transmitted is illustratively shown as a binary non-return-to-zero (NRZ) signal, which is applied to the input of an NRZ-to-biphase converter 50 of conventional known construction. This converter develops a biphase data signal, as illustrated in FIG. 3B, having a sinusoidal waveform and a phase which is either 0° or 180° depending upon whether the corresponding binary data signal is a "one" or a "zero".

The frequency of the biphase data signal is controlled by a signal supplied to the converter through a frequency divider 52 which receives its input from a sweep generator 54. For example, the sweep generator may produce a sinusoidal sweep signal of 20 KHz (FIG. 3C); the divider 52 may reduce this by a factor (M) of 2, so that the frequency of the biphase data signal (B) would be 10 KHz. It is important to note that with this arrangement, the frequency of the data signals is positively locked to the frequency of the sweep signal in a harmonic relationship.

The biphase data signal (B) is combined with the sweep signal (C) in a summing device or adder 56 the output of which is applied, as a composite base band signal, to an FM modulator 58. This modulator serves as a signal generator to direct to an antenna 60 a high-frequency (e.g. 100 MHz) carrier signal the frequency of which is modulated in accordance with the base band signal. If there are no data signals present, the carrier will be swept in a purely sinusoidal fashion, as illustrated in FIG. 3D. The sweep range may for example be 1 MHz. With the biphase data signal added, the sinusoidal sweep of the carrier will be augmented by additional frequency modulation in accordance with the instantaneous magnitude of the data signal, and the carrier frequency thus will be as illustrated in FIG. 3E.

Figure 4:
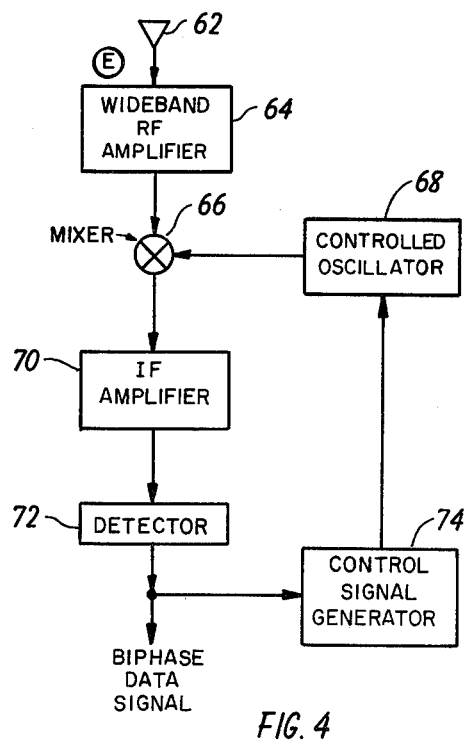
FIG. 4 shows the basic elements of a frequency-tracking receiver in accordance with the present invention.

FIG. 4 shows the basic elements of one frequency-tracking receiver adapted for use in the present invention. Such a receiver may, for example, form part of one of the LTR units illustrated in FIG. 1, arranged to track the carrier frequency of a signal from the transmitter portion of one of the ZTR units 20, 22. The receiver of FIG. 4 comprises the usual antenna 62 coupled to a wide-band RF amplifier 64 the output of which is coupled to one input of a mixer 66. The second mixer input is derived from a controlled local oscillator 68 having a center frequency which is offset from the center frequency of the received carrier, e.g. by about 10 MHz. The frequency of the oscillator is swept in such a way (as will be explained hereinafter) as to match substantially the sweeping of the received carrier. Accordingly, the output of the mixer will be a signal having a base frequency equal to the offset or difference frequency between the carrier and local oscillator signals, but frequency-modulated in accordance with the data signals accompanying the received swept carrier. In effect, the sweeping of the local oscillator signal "nulls" or "cancels" the sweeping of the incoming carrier, to produce a non-swept and therefore narrow-band signal at the mixer output.

This mixer output signal, having essentially no sweep-frequency component, is directed to a narrow-band IF amplifier 70 which also provides filtering to reject noise or other interference. The amplified signal is fed to a detector 72 which recovers the biphase signals for the receiver output. These data signals also are directed to a control signal generator 74 which produces a control signal for the local oscillator 68, to cause the oscillator frequency to be swept in synchronism with the received carrier signal sweep.

Figure 5:
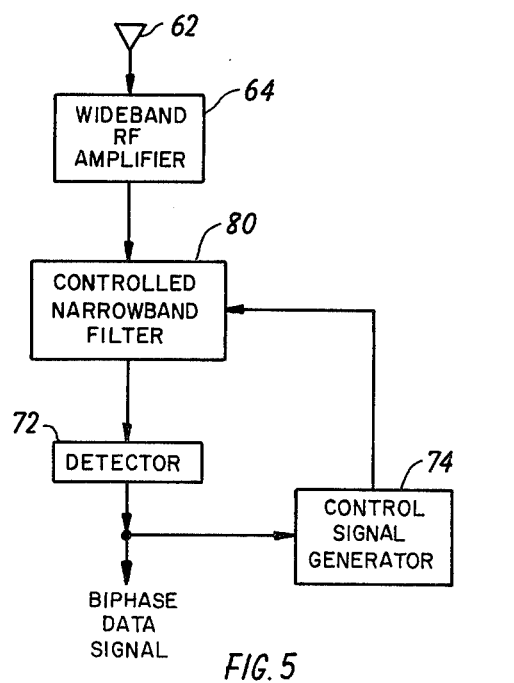
FIG. 5 shows the basic elements of another type of frequency-tracking receiver in accordance with the invention.

FIG. 5 illustrates another tracking receiver having the usual antenna 62 and wide-band RF amplifier 64. Here, however, the received carrier is passed through a controlled narrow-band filter 80 rather than being heterodyned with a local oscillator. This filter is controlled by a signal from the control signal generator 74, which shifts the center frequency of the filter in a fashion to track the center frequency of the incoming swept-frequency carrier. For example, this can be effected by the use of voltage-controlled reactances in the filter. As before, the control signal generator 74 receives a signal corresponding to the demodulated data signals, and that signal synchronizes the control signal to the filter so as to assure correspondence between the filter center frequency and the incoming carrier center frequency.

Several possible structural arrangements for the control signal generator 74 are shown in FIGS. 6A–6E. In FIG. 6A, the biphase data wave first is frequency-multiplied by two in a frequency multiplier 90. This eliminates the phase-shift modulation in the data wave and produces an unmodulated sine-wave at twice the biphase frequency (and thus at the carrier sweep frequency). The frequency multiplication can be performed by various devices, including nonlinear elements such as rectifiers, multipliers, square-law devices, etc.

A bandpass filter 92 selects the second harmonic of the biphase wave and rejects any interfering components. This second harmonic signal, at the sweep frequency, is coupled to a bandpass limiter 94 which produces at its output a pure sinusoidal waveform of constant amplitude and at the sweep frequency. A fixed phase adjustment in a phase adjuster 96 then follows, before the sweep waveform becomes the control signal for the controlled oscillator 68 (or filter 80).

Another version of the control signal generator 74 is shown in FIG. 6B. Here, the frequency multiplication is performed in a rectifier 98 while the functions of the bandpass filter 92 and the bandpass limiter 94 are performed by a locked oscillator 100 which may be implemented in various ways, e.g. as an injection locked oscillator, a phase-locked loop, a pulled multivibrator followed by a bandpass filter, etc.

FIG. 6C shows yet another version of the control signal generator 74. Here the frequency multiplication is performed by a square-law device 102 and the location of the phase adjuster 96 and the locked oscillator 100 are interchanged. In addition, a shape adjuster 104 may change the shape of the sweep, as for example from a sine-wave to a triangular wave.

FIG. 6D shows a block 106 which represents the function performed by previously-described equipment, such as the frequency multiplier 90, and here identified as a "modulation eliminator". This is followed by a frequency adjuster 112, as amplitude adjuster 114, a phase adjuster 96 and a shape adjuster 104 (not necessarily in the order indicated). These functions can be combined into the basic block diagram of FIG. 6E including the modulation eliminator 106 and a generalized signal conditioner circuit 116.

Figure 7:
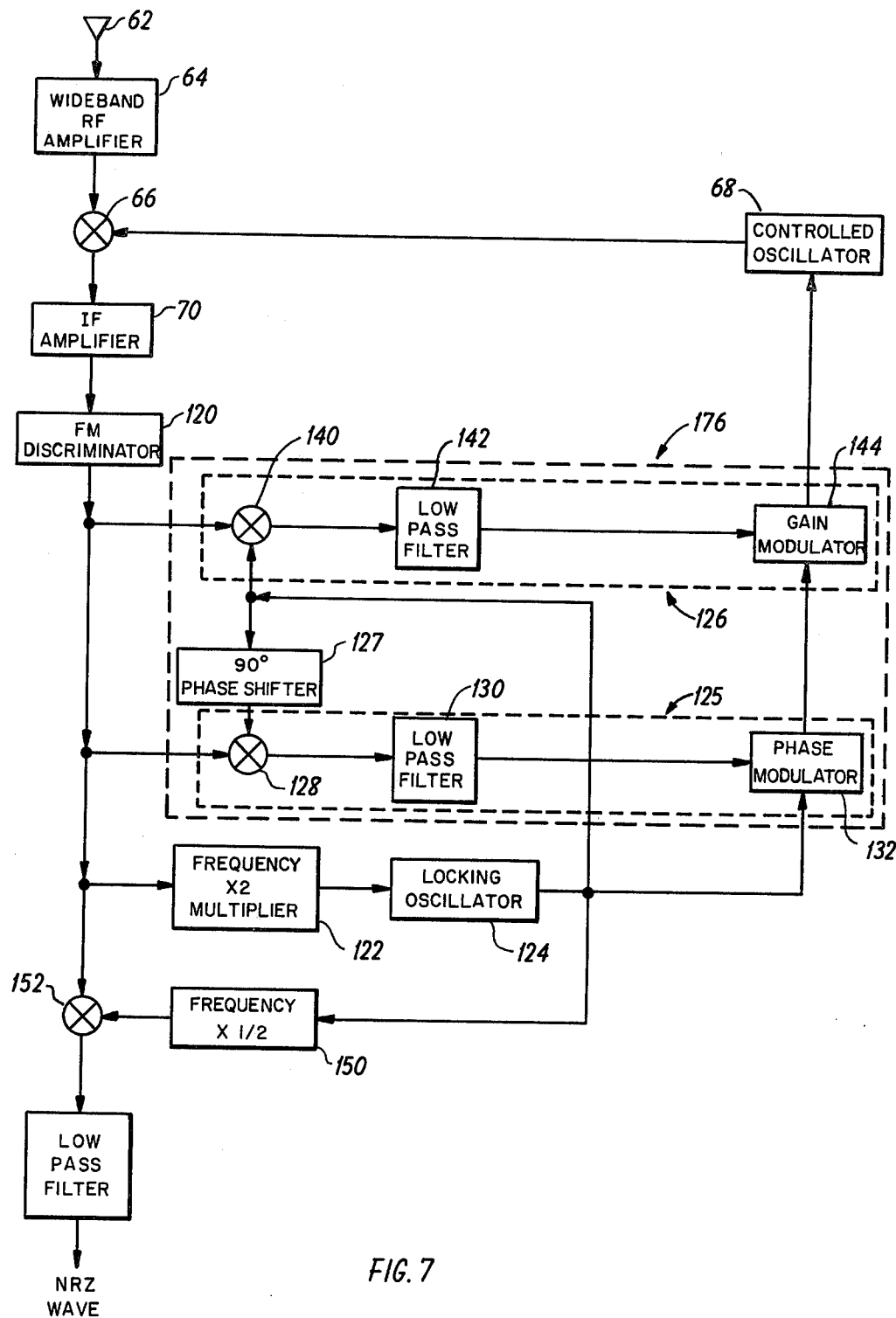
FIG. 7 shows another frequency-tracking receiver arrangement.

FIG. 7 shows a receiver having still further features. As in the FIG. 4 arrangement, the swept-carrier signal passes through the antenna 62 and a wide-band RF amplifier 64 to a mixer 66 driven by a swept-frequency, controlled local oscillator 68. The output of the mixer is coupled through a narrow-band IF amplifier 70 to an FM discriminator 120 arranged to develop the basic data signals which are directed to further circuits as follows.

In one of these further circuits, the detected data signals are fed to a frequency multiplier circuit 122 which, as before, produces an output at twice the frequency of the data signals. This circuit serves like a full-wave rectifier to provide a "squaring" function such that the negative-going portions of the data signals are inverted into positive-going signals (or vice versa). Thus, as in a full-wave rectifier, the output becomes a series of sequential uni-directional half-cycle waves occurring at twice the frequency of the original data signals. By suitable filtering, this series of half-wave signals is converted to a sine-wave at double the frequency of the original data signals.

This double-frequency sine-wave signal is directed to a locking oscillator 124 the frequency of which is synchronized with the incoming sine-wave frequency, thereby effecting synchronization with the original biphase data signals. The output of the locking oscillator serves as the basic sweep control signal for the local oscillator 68. However, in this embodiment provision is made for optionally modifying the control signal by two additional signal conditioning circuits generally indicated at 125 and 126, and serving to adjust the amplitude and phase of the control signal as described below.

To activate the first of these conditioning circuits 125, the basic sweep control signal from the locking oscillator 124 is fed through a 90° phase shifter 127 to a multiplier 128 which also receives the original data signals from the FM discriminator 120. The output of this multiplier is coupled to a low-pass filter 130 and the combination of these elements serves to detect the presence of any quadrature component of the original sweep frequency appearing at the discriminator output. Such component would be an indication of a phase difference between the sweep of the incoming carrier and the sweep of the controlled oscillator 68. This quadrature signal is directed to a phase modulator 132 which functions to adjust the phase of the basic sweep control signal so as to establish close phase tracking between the local oscillator signal and the incoming swept carrier.

In the other conditioning circuit 126, the basic sweep control signal from the locking oscillator 124 is combined in a second multiplier 140 with the data signals from the FM discriminator 120. This multiplier output is directed to a low-pass filter 142 which, with the multiplier 140, serves to detect the presence of any in-phase component of the carrier sweep at the output of the discriminator. Such in-phase component would indicate that the amplitude of sweep of the local oscillator differs from the amplitude of sweep of the incoming carrier. The resultant signal from this detector circuit is fed to a gain modulator 144 which automatically adjusts the magnitude of the sweep control signal to provide for sweep amplitude equality.

The basic sweep control signal also is directed through a 2:1 frequency divider 150 to produce a signal at the frequency of the original data signals. This signal is coupled to a phase detector 152 together with the biphase data signals, to recover the original NRZ signals.

Figure 8:
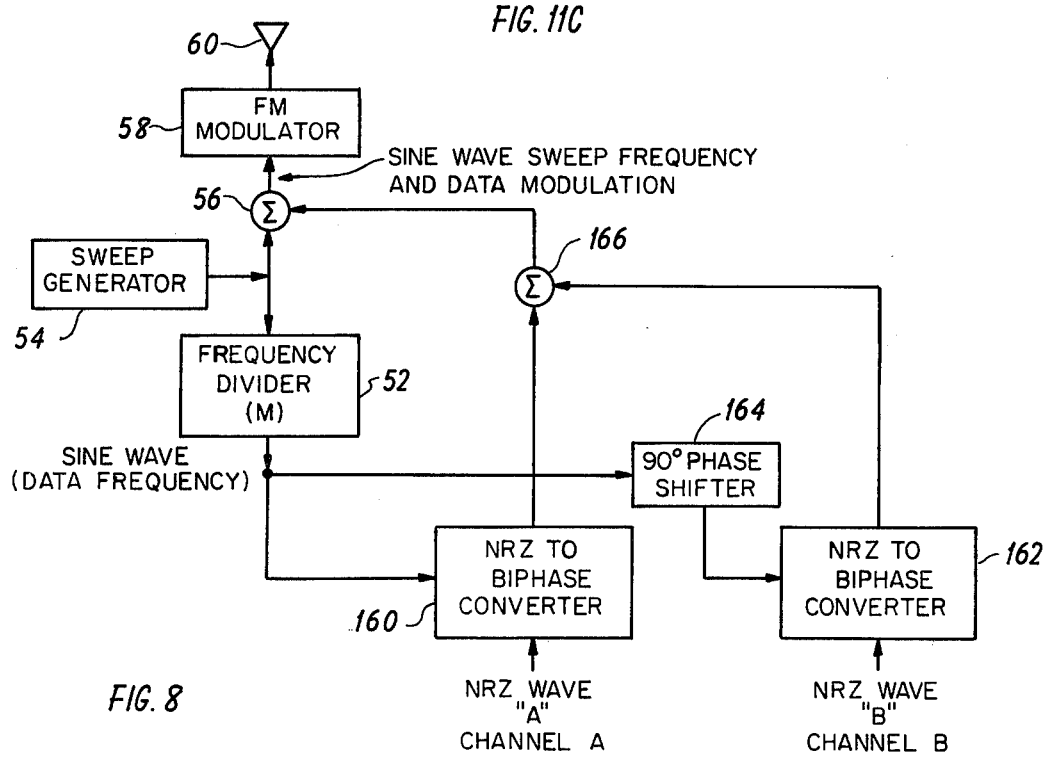
FIG. 8 shows a swept-carrier transmitter for generating a carrier modulated with Quadri Phase Shift Keyed (QPSK) data signals.

The invention also can be used with multilevel digital data. For example, where the data signals are not of straight biphase form but rather or QPSK (Quadri Phase Shift Keying) form, a suitably-modulated swept-carrier signal can be produced by a transmitter as shown in FIG. 8. This apparatus is arranged to effect the transmission of data on two non-interfering (i.e. orthogonal) binary channels identified as "A" and "B". In channel A, the data is encoded by switching the phase of a sine wave between 0° and 180°. In channel B, the data is encoded by switching a cosine wave between 0° and 180°.

Data selected for transmission over channel "A" and over channel "B" is connected directly in its NRZ waveform to NRZ-to-biphase converters 160 and 162, respectively. The output of the converter 160 is in the same biphase format as the output of the other converter 162, but the biphase signals from the latter are 90° out of phase with respect to the output of the first converter 160, due to the interposition of a 90° phase shifter 164 in the synchronizing control signal line leading to the second converter.

As in the transmitter arrangement of FIG. 2, the synchronizing control signal is developed by a frequency divider 52 which receives its input signal from the sweep generator 54. This sweep generator also controls the sweeping of the transmitted carrier generated by the FM modulator 58, and therefore there is established by these means a predetermined, fixed relationship in frequency and phase between the carrier sweep frequency and the frequency of the biphase data signals.

The two sets of biphase data signals are combined in an adder 166. The output of this adder is combined with the sweep signal in the adder 56, to form a composite base band signal that frequency-modulates the carrier in the FM modulator 58 before being transmitted over the antenna 60. It will be seen that the resulting QPSK wave has four possible phases separated from each other by 90°. The additional data channel thus provided may be used (1) to double the rate of data transmission, (2) to make in-band measurements of noise conditions, or (3) to provide separate "transmit" and "receive" channels on the same carrier frequency.

Figure 9:
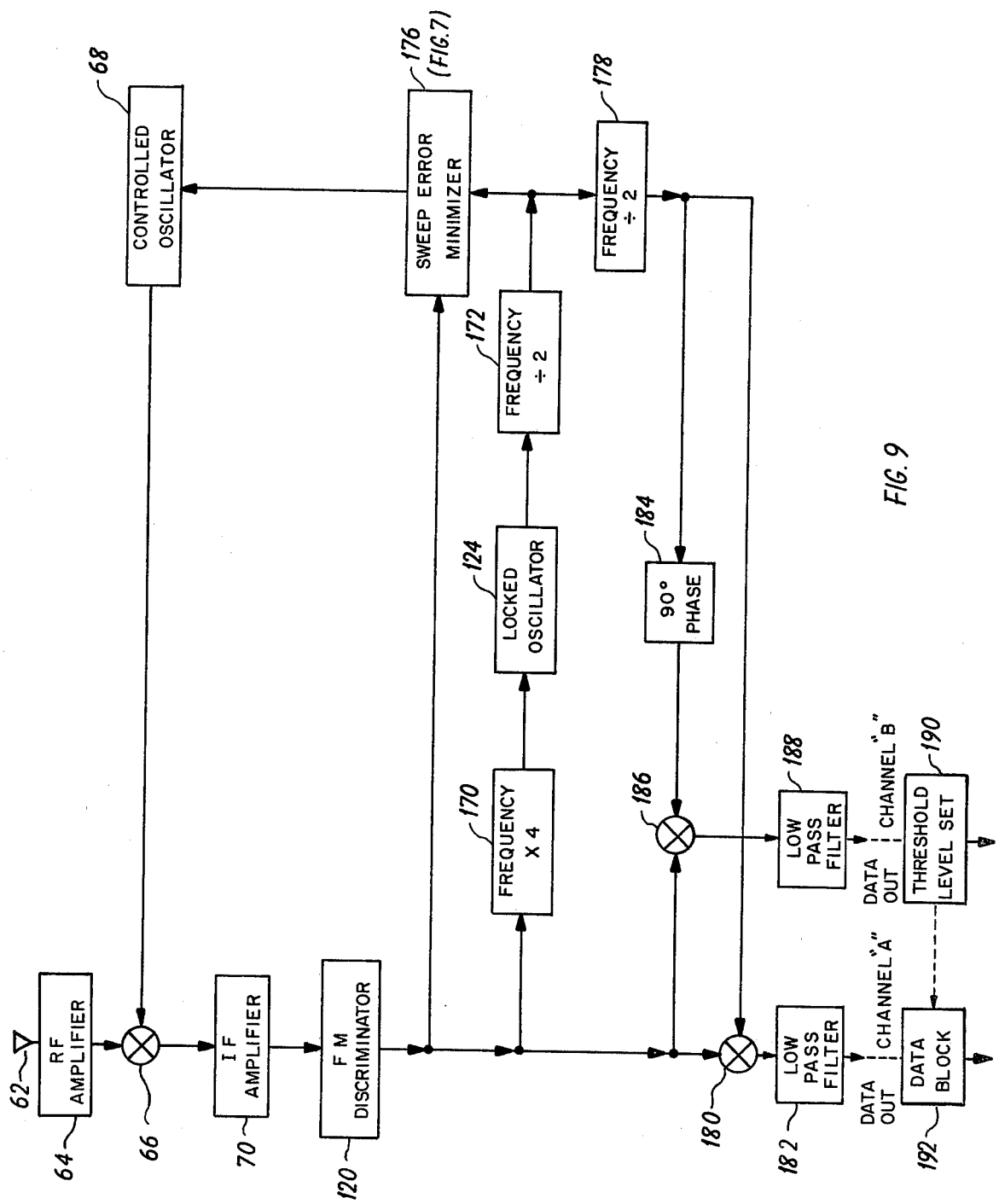
FIG. 9 shows a frequency-tracking receiver for use with the transmitter of FIG. 8.

In the two-channel receiver, shown in FIG. 9, coherent detection separates the two data channels A and B with no interchannel interference. The function of the mixer 66, as well as other circuit elements with the same reference numerals, has been described previously. The QPSK wave at the output of the FM discriminator 120 is frequency-multiplied by a factor of four by a multiplier 170 in order to eliminate all phase modulation due to the QPSK data. The locking oscillator 124, as before, filters the signal and establishes an appropriate amplitude level.

The resulting sinusoidal signal then if frequency-divided by two in a divider 172 to produce a sweep control signal at the original sweep frequency. This sweep control signal is directed through a sweep-error-minimizing circuit generally indicated in block form at 176, and including automatic signal adjustment circuitry such as detailed in FIG. 7. The output of this circuitry is fed to the controlled oscillator 68 as before, to synchronize the sweep of this oscillator with that of the incoming carrier.

The sweep control signal from the divider 172 is further divided by two in a circuit 178 to provide a reference signal at the QPSK frequency. The channel "A" data is detected coherently with this reference signal by means of a multiplier 180 and a lowpass filter 182, and the channel "B" data similarly is coherently detected with this reference signal, shifted 90° in phase by a phase shifter 184, through the use of a multiplier 186 and a second lowpass filter 188.

With no data sent over channel B, its output is available as an indication of the in-band noise conditions. By providing a threshold level set 190 arranged to operate a data block 192 in channel A when noise levels exceed specified values, it is possible to prevent the distribution or recording of erroneous data, and to provide a warning indication to operators of the system of such malfunction.

As in any frequency-tracking receiver, before automatic tracking is established, i.e. when the receiver is first turned on, the sweep of the local oscillator 68 typically will differ somewhat from that of the incoming carrier signal. Thus the signal at the output of the IF amplifier 70 may initially appear as brief bursts of pulses generated each time the output of the mixer 66 is swept through the IF bandpass. This train of pulses will inherently tend to pull the sweeping of the local oscillator into synchronism with the incoming carrier. The pull-in or acquisition time is affected by the locking oscillation bandwidth and the amount by which the incoming and local sweep frequencies initially differ. It is advantageous to adjust the locking oscillator quiescent frequency to be only slightly different from the expected incoming sweep frequency, as an aid to fast acquisition and lock-in. The technology of tracking acquisition has been well established in the prior art; for additional detailed information on the subject, reference may be made to pull-in characteristics in a book by J. J. Stiffler entitled "Theory of Synchronous Communications" (Prentice Hall, 1971).

Pull-in capability for receivers as described herein may be enhanced by using as the frequency multiplier 122 a half-wave rectifier followed by a bandpass filter. A half-wave rectifier produces a strong component at the fundamental frequency of any incoming a-c signal, as well as a component at twice that frequency. When the IF pulses generated by a frequency difference between the incoming and local sweeps are half-wave rectified, the initially large signal component at the sweep frequency helps to stabilize the oscillator sweep frequency rapidly, to effect pull-in. Thereafter the double-frequency component of the biphase data wave grows relatively larger than the fundamental sweep signal and eventually takes over completely the control of the sweep waveform. Nonlinearities other than half-wave rectification exist that produce both the fundamental and the second harmonic simultaneously. In the general case, when the sweep frequency is M times the frequency of the data signal and a multiplication by N is required in the sweep modulation cancellation process, then a nonlinearity should be selected which produces an output at a frequency N times that of the data signal and N/M times that of the sweep frequency.

Figure 10:
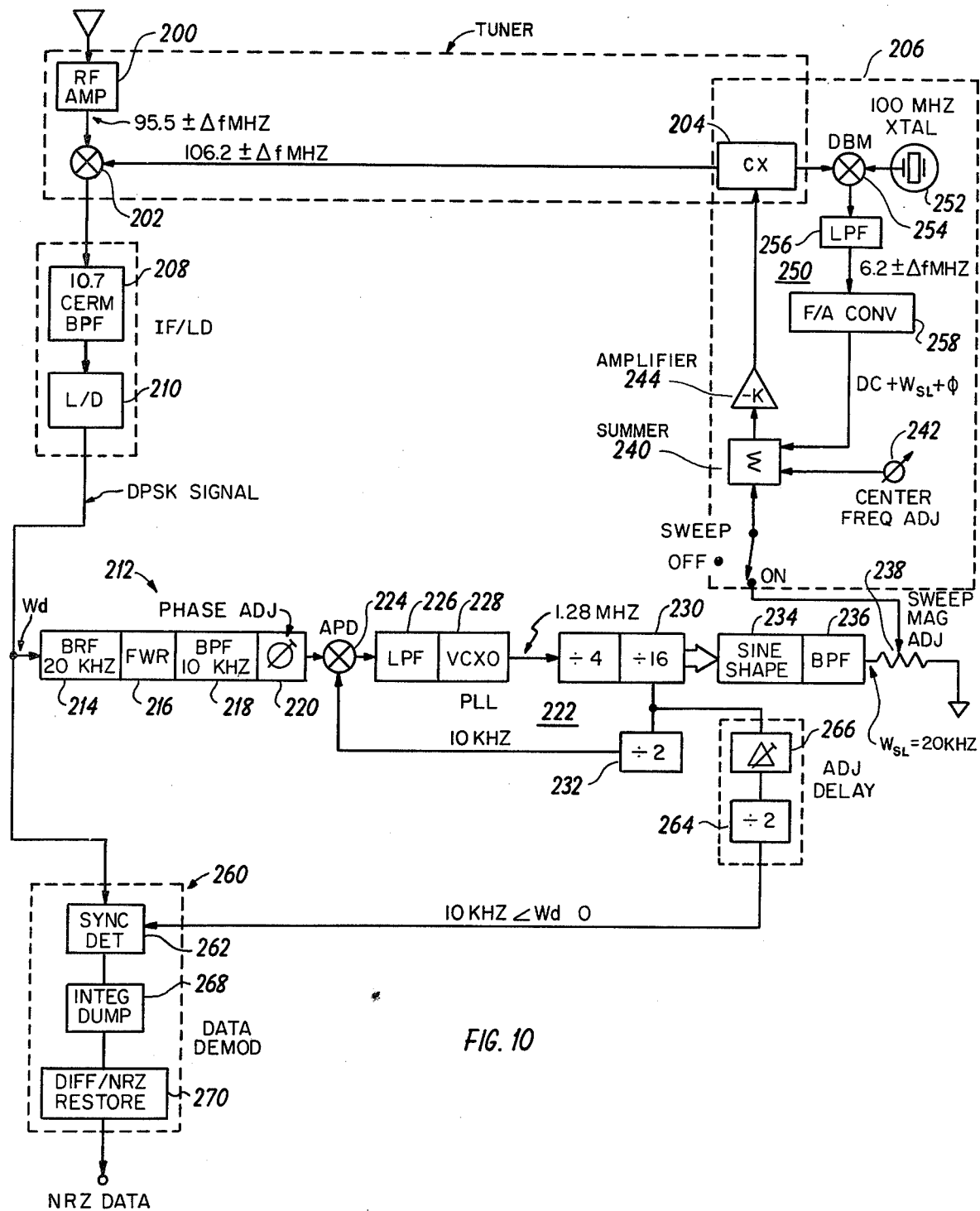
FIG. 10 is a block diagram showing another frequency-tracking receiver in accordance with the principles of this invention.

FIG. 10 presents a detailed block diagram of a frequency-tracking receiver in accordance with this invention. In a model based on this design, the signal directed through the RF amplifier 200 had a center frequency of 95.5 MHz. The data signals were of biphase form, at a base frequency of 5 kHz, and the incoming carrier was swept sinusoidally at 20 kHz over a range of 1 MHz.

In this model, the RF amplifier 200, the associated mixer 202 and the voltage-controlled oscillator circuit 204 incorporated in the local oscillator 206, formed part of a commercially available high-frequency tuner produced by the Heathkit Company as their part No. 110-61. The local oscillator had a center frequency of 106.2 MHz, so that the IF signal was at a frequency of 10.7 MHz. This signal was directed through a ceramic bandpass filter 208 followed by a limiter/discriminator 210. The discriminator output signal, in the form of Differential Phase Shift Keying (DPSK) data signals (also identified as $W_d$), was directed to a control signal generating circuit generally indicated at 212 and now to be described.

In the circuit 212 the data signals $W_d$ first are passed through a band-rejection filter 214, centered at the sweep frequency of 20 kHz, and from there are led to a fullwave rectifier 216 to produce a signal component at twice the data signal rate, i.e. at 10 kHz. This 10 kHz signal is directed to a corresponding bandpass filter 218, and then passed through a phase adjuster 220. The phase-adjusted signal is fed as an input signal to a phase-locked loop (PLL) circuit generally indicated at 222, and arranged to produce a highly stabilized 20 kHz signal synchronized in frequency with the sweep of the incoming carrier signal.

The input to the PLL 222 is directed first to an analog phase detector (APD) 224, where it is compared with a feedback signal of 10 kHz frequency. The result of this comparison is fed to a lowpass filter 226 and thence to a voltage-controlled oscillator 228, operating at 1.28 MHz, to provide synchronization for the oscillator. The oscillator output is passed through a frequency-divider 230 having a net dividing factor of 64:1 so as to produce a 20 kHz output signal. This output signal is coupled to a 2:1 frequency divider 232 to produce the 10 kHz feedback signal for the phase detector 224. The 20 kHz output signal also is coupled to conditioning circuitry including a shape-adjuster 234 for producing a sine-wave shape, and a bandpass filter 236 tuned to the sweep frequency of 20 kHz. The output of this filter forms the sweep control signal ($W_{SL}$) at the desired 20 kHz rate. A potentiometer 238 is provided to adjust the amplitude of this signal.

This sweep control signal is directed to a crystal-referenced, linearized local oscillator, generally indicated by the block 206. This local oscillator includes a summer 240 which also receives a center-frequency-adjustment signal from a manually-settable device 242. The output of the summer is fed through an amplifier 244 to the voltage-controlled circuit 204.

The linearizing circuitry includes a control feedback loop as generally indicated at 250 and comprising a crystal-controlled oscillator 252 operating at a frequency of 100 MHz. The output of this oscillator is coupled to a double-balanced mixer 254 together with the output of the oscillator circuit 204. The mixer output indicates the frequency difference between the two mixer input signals, and is fed through a lowpass filter 256 to a frequency-to-analog converter 258. The output of this converter provides a DC feedback signal, with a component $W_{Sl+\phi}$, corresponding to the actual frequency sweep of the local oscillator 206. This feedback signal is fed to the input of the summer 240 for comparison with the sweep control signal received from the potentiometer 238. Any deviation of the actual local oscillator frequency sweep from that commanded by the sweep control signal will automatically produce the appropriate error signal to adjust the sweep of the local oscillator 206 to minimize such error.

The data signals from the discriminator 210 also are fed to a data demodulator generally indicated at 260, and including a synchronous detector 262 to receive the data signals. A 10 kHz reference signal for this detector is derived from a circuit including a 2:1 frequency divider 264 and a phase adjuster 266 coupled to the 20 kHz output of the PLL 222. The output of the detector 262 is integrated by an integrator 268 to determine, in the presence of any noise signals, whether the data signal is a "one" or a "zero". When the decision has been made at the end of the integrate time, the integrator contents are dumped to prepare for the next operation. The results of the data signal determination are passed on to the output stage 270 which restores the original NRZ format.

Figure 11C:
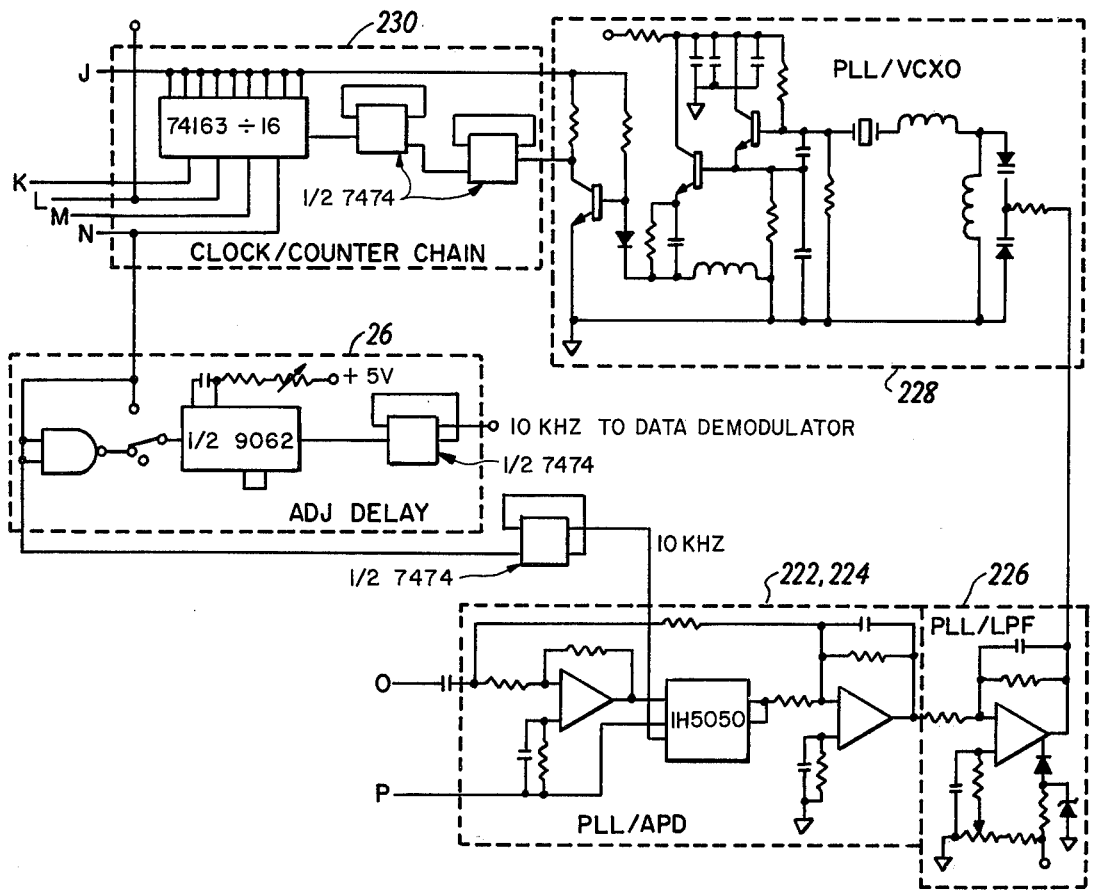
FIGS. 11A through 11C show details of a frequency-tracking receiver in accordance with this invention.
Figure 11A:
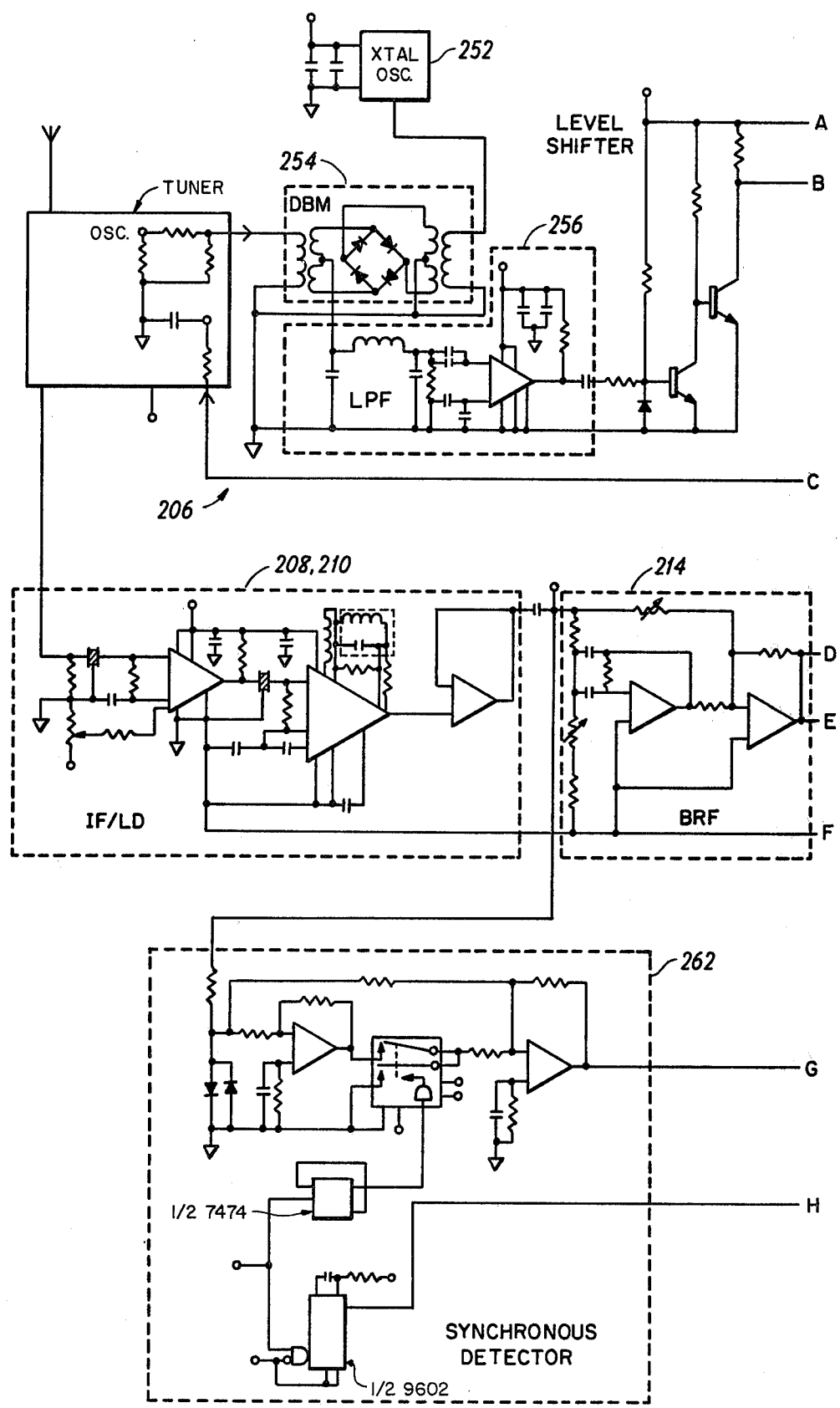
Figure 11B:
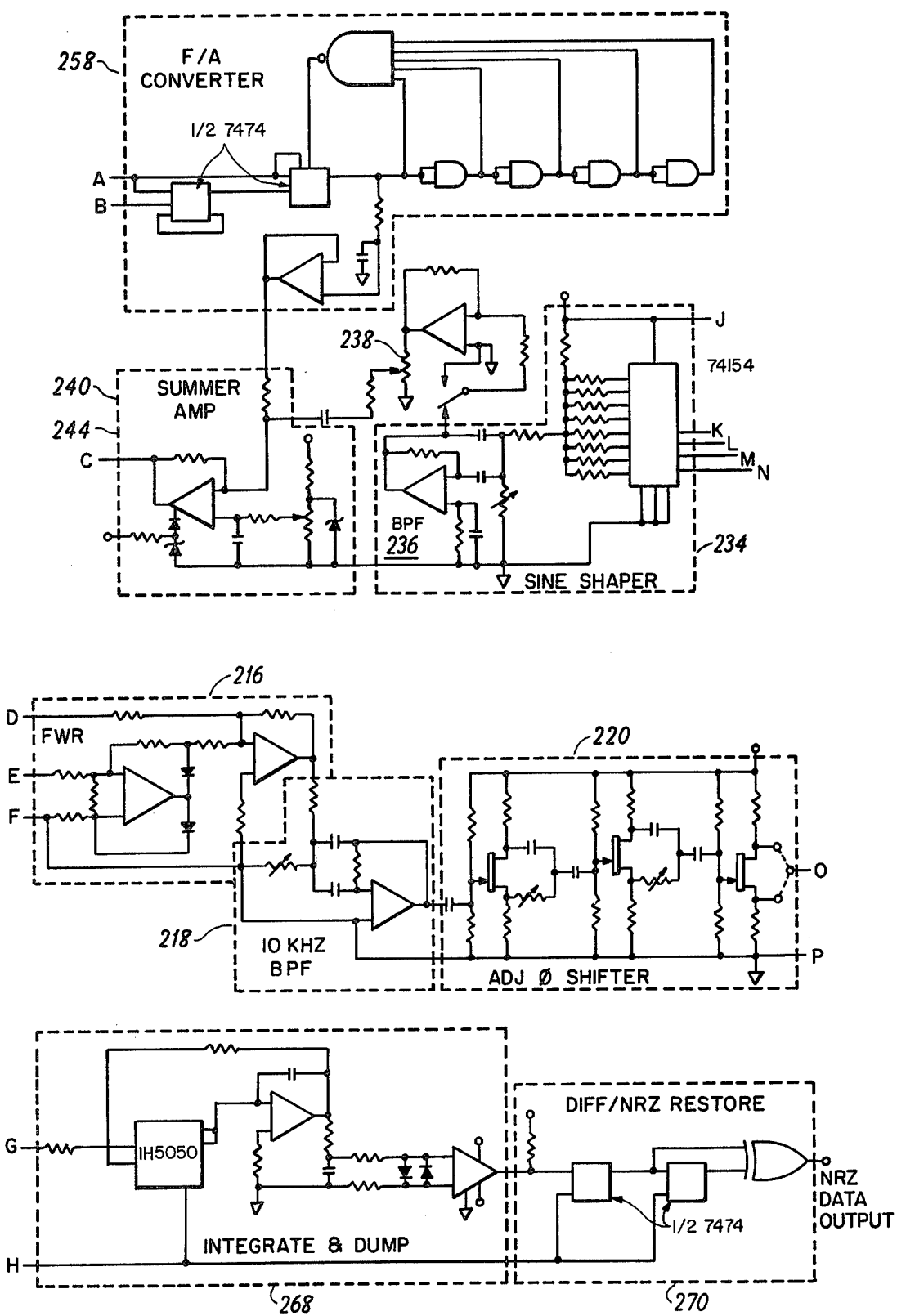

FIGS. 11A–11C have been included to show the circuit details of one frequency-tracking receiver as set forth in the block diagram of FIG. 10. Identical reference numbers have been used on FIGS. 11A–11C for the same components of the apparatus, in order to establish the correspondence between the two showings. The internal functioning of the various components is in accordance with well known relationships, and therefore will not be described herein since it will be understood by those skilled in this art.

Although preferred embodiments of the invention have been described herein in detail, it is desired to emphasize that this is for the purpose of illustrating the principles of the invention, and should not necessarily be construed as limiting of the invention since it is apparent that those skilled in this art can make any modified arrangements of the invention without departing from the true scope thereof.

We claim:

1. In process control apparatus of the type to be used with a complex industrial process having at remote locations a number of variable conditions to be controlled from a central location, wherein data signals are transmitted between the central location and the remote locations by a data transmission system in which a data-modulated high-frequency carrier signal is swept in a repetitive time pattern through a wide range of frequencies;

the transmitter apparatus of said system being arranged to provide that a characteristic of the data signal modulation has a predetermined relationship with respect to said repetitive time pattern; the system further including receiving means to receive and track said high-frequency carrier signal, as follows:

(1) mixer means having first and second inputs and an output;

(2) a signal channel coupled to said mixer output and having a relatively narrow bandwidth relative to said sweep range of frequencies;

(3) means to couple to said first mixer input a swept-frequency signal derived from and corresponding to said high-frequency swept-carrier signal;

(4) a local oscillator coupled to said second mixer input;

(5) control means adapted to alter the frequency of said local oscillator throughout a range of frequencies matching the range of frequencies of said swept-frequency signal;

(6) operating means coupled to the output of said mixer means to develop a control signal derived from the data signal modulation on said swept-frequency signal, said control signal representing said data-signal characteristic;

(7) means coupling said control signal to said control means; and (8) said control signal effecting synchronism between the sweeping of said local oscillator and the sweeping of said swept-frequency signal to effectively null the sweep of said swept-frequency signal so as to produce a corresponding narrow-band data-modulated signal for said narrow-band signal channel.

2. Apparatus as claimed in claim 1, wherein the frequency of said data signals is harmonically related to the frequency of sweeping of said carrier signal.

3. Apparatus as claimed in claim 2, wherein said data signals have a biphase format.

4. Apparatus as claimed in claim 1, wherein said signal channel includes an IF amplifier stage to effect filtering of all frequencies outside of said narrow bandwidth.

5. Apparatus as claimed in claim 2, including means responsive to said data signals to produce a control signal having a frequency which is a multiple of the frequency of said data signals, and equal to the frequency of said sweeping of said carrier signal.

6. Apparatus as claimed in claim 5, wherein said means responsive to said data signals comprises a non-linear device adapted to produce an output signal having components harmonically related to the frequency of said data signals.

7. Apparatus as claimed in claim 1, wherein said operating means includes detector means coupled to said mixer means to produce said data signals;

said operating means further including means responsive to said data signals for generating said control signal.

8. Apparatus as claimed in claim 7, wherein said operating means includes means for developing a signal responsive to any sweep frequency component accompanying said data signals;

said operating means including means to automatically adjust said control signal in accordance with said sweep frequency component to effectively eliminate said sweep frequency component.

9. Apparatus as claimed in claim 8, wherein said developing means includes adjusting means responsive to any sweep-frequency component accompanying said data signals which is in-phase with said sweep frequency;

said adjusting means being operable to alter the amplitude of said control signal to minimize said in-phase component.

10. Apparatus as claimed in claim 8, wherein said developing means includes adjusting means responsive to any quadrature sweep-frequency component accompanying said data signals;

said adjusting means being operable to alter the phase of said control signal so as to minimize said quadrature component.

11. Apparatus as claimed in claim 1, wherein said operating means includes non-linear means responsive to the data signals to produce a signal having fundamental and harmonic components;

said operating means further including means responsive to one of said harmonic components to develop said control signal.

12. Apparatus as claimed in claim 11, wherein said non-linear means comprises half-wave rectifier means.

13. For use in an industrial process control system and the like, a data transmission system of the type including transmitter means for developing a high-frequency swept-carrier signal modulated with data signals, and receiving means at a distant location arranged to track said swept-carrier signal;

(A) said transmitter means comprising:
(1) signal-generating means for producing said high-frequency carrier signal;
(2) sweep means coupled to said signal-generating means to cause the frequency of said carrier to be swept repetitively through a predetermined range of frequencies in accordance with a repetitive time pattern;
(3) means responsive to said data signals and coupled to said signal-generating means to modulate said carrier signal in correspondence to said data signals while said carrier signal is being swept through said range of frequencies; and
(4) means to establish a predetermined relationship between a characteristic of said data signals and said repetitive time pattern;

(B) said receiver means comprising:
(1) input means responsive to said carrier signal for developing a corresponding swept-frequency receiver signal;
(2) local oscillator means adapted to receive a sweep signal to produce a swept-frequency local oscillator signal;
(3) means to combine said local oscillator signal with said receiver signal to produce an output signal carrying said data modulation but wherein the frequency sweep of said carrier signal is effectively cancelled when the sweep of said local oscillator signal matches that of said receiver signal;
(4) detector means responsive to said output signal for producing a sweep control signal corresponding to said data signal characteristic; and
(5) means responsive to said control signal for matching the frequency sweep of said local oscillator to the frequency sweep of said carrier signal thereby to provide effective cancellation of said carrier frequency sweep so as to aid in developing said output signal with a narrow-band characteristic.

14. Apparatus as claimed in claim 13, wherein said characteristic of said data signals includes both the frequency and phase thereof.

15. Apparatus as claimed in claim 13, wherein there is a fixed relationship between the period of sweep of said carrier and the period of said data signals.

16. Apparatus as claimed in claim 15, wherein said carrier sweep has a frequency which is harmonically related to the frequency of said data signals.

17. Apparatus as claimed in claim 16, wherein said sweep is a substantially sinusoidal function.

18. Apparatus as claimed in claim 13, including means to apply two channels of data signals to said carrier;
said receiver means including means to detect said two channels of data signals independently.

19. Apparatus as claimed in claim 18, wherein said two channels are provided by modulating said carrier with two sets of BPSK signals.

20. Apparatus as claimed in claim 18, wherein said receiver means includes means responsive to the noise level in one of said channels.

21. A receiver for tracking an incoming carrier signal modulated by a data component and a sweep-frequency component, the sweep-frequency component having a predetermined fixed relationship with an aspect of the data component, comprising:
input means to receive said incoming carrier signal;
means responsive to said carrier signal for producing a data component signal;
circuit means including an oscillator circuit responsive to said data component signal to generate a varying-frequency signal component matching said sweep-frequency component; and
means to combine said matching signal component with said incoming carrier signal to substantially eliminate the sweep-frequency characteristic from the incoming signal so as to produce a substantially fixed intermediate frequency signal modulated with said data signal component.

22. The tracking receiver of claim 21, including narrow-band intermediate-frequency circuit means to limit the noise energy.

23. The tracking receiver of claim 21, wherein the carrier frequency is swept so as to move the carrier frequency in a periodic fashion over a pre-selected range.

24. The tracking receiver of claim 21, wherein said data signal component is phase encoded.

25. In process control apparatus of the type to be used with a complex industrial process having at remote locations a number of variable conditions to be controlled from a central location, wherein data signals are transmitted between the central location and the remote locations by a data transmission system in which a data-modulated high-frequency carrier signal is swept in a repetitive time pattern through a wide range of frequencies;
the transmitter apparatus of said system being arranged to provide that a characteristic of the data signal modulation has a predetermined relationship with respect to said repetitive time pattern; the system further including receiving means to receive and track said high-frequency carrier signal, as follows:
(1) input means to develop a swept-frequency signal derived from and corresponding to said high-frequency swept-carrier signal;
(2) narrow-band tunable-frequency signal-selecting means having an input to which said swept-frequency signal is directed;
(3) said signal-selecting means including means responsive to a control signal for varying the tuning of said signal-selecting means to match the changing frequency of said swept-frequency signal;
(4) said signal-selecting means producing an output carrier signal derived from said swept-frequency signal and modulated with the data signals of said swept-frequency signal;
(5) means responsive to the data modulated carrier signal for developing a data component signal; and
(6) control means responsive to said data component signal to produce said control signal for said signal-selecting means, said control means serving to alter the tuning of said signal-selecting means so as to establish matching synchronism between the changes in said tuning and the frequency of said swept-frequency signal.

26. Apparatus as in claim 25, wherein said signal-selecting means comprises a controllable narrow-band filter.

27. A receiver for tracking an incoming carrier signal modulated by a data component and a sweep-frequency component, the sweep-frequency component having a predetermined fixed relationship with an aspect of the data component, said receiver comprising:
input means to receive said incoming carrier signal;
means responsive to said carrier signal for producing a data component signal
circuit means including a signal-generating circuit responsive to said data component signal to generate a control signal matching the frequency sweep characteristic of said sweep-frequency component; and
narrow-band tunable-frequency signal-selecting means the tuning of which is controlled by said control signal, said signal-selecting means receiving said incoming carrier signal and automatically tracking the carrier frequency thereof to produce a corresponding narrow-band output carrier signal modulated with said data signal component.

* * * * *